Patented Dec. 23, 1952

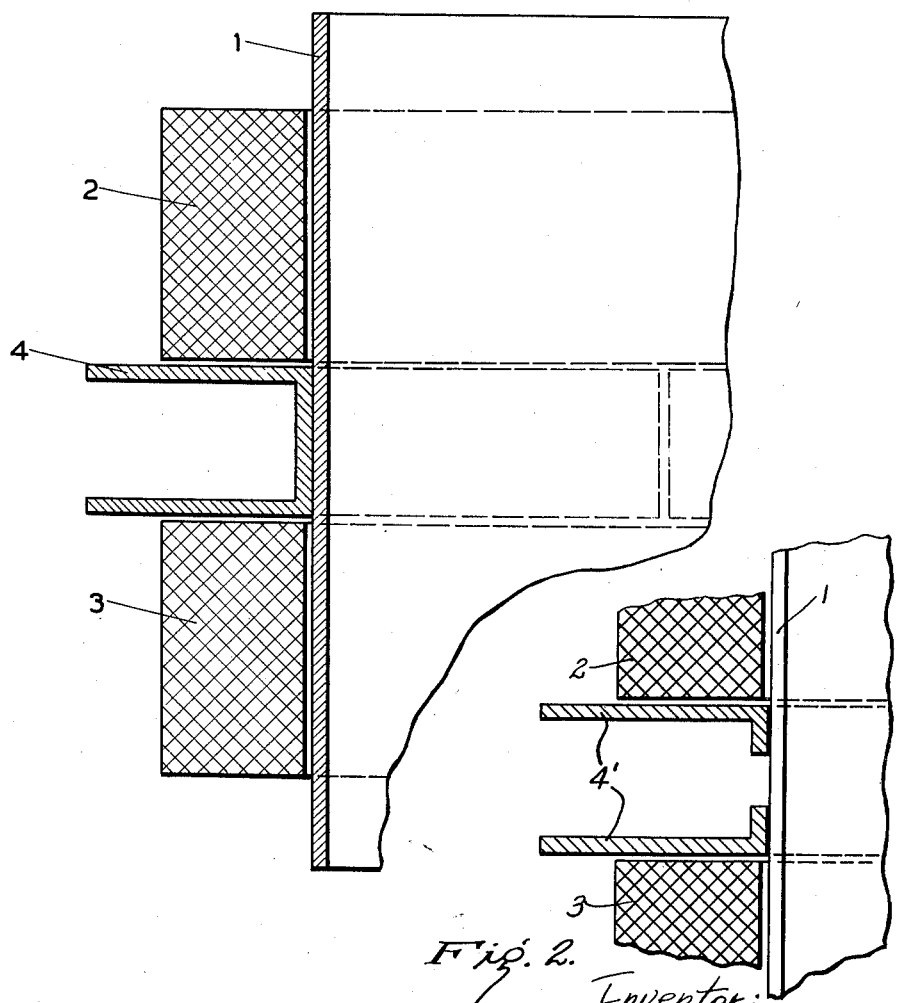

2,623,081

UNITED STATES PATENT OFFICE 2,623,081

INDUCTION COIL MOUNTING

Carl Christian Schörg, Frankfurt-on-the-Main-Hochst, Germany

Application December 13, 1949, Serial No. 132,726
In Germany December 14, 1948

1 Claim. (Cl. 13—27)

Inductive firing of vessels and the like is often done by putting the vessel to be heated into the interior of a heat resistant winding passed by A. C. In case there is worked with normal frequency that electric energy may directly be taken from the power supply system one wants to use three-phase-current especially with greater connecting values. This is possible by application of the Scott switching. There is, however, the disadvantage that the coils must have different winding numbers and that only with seldom cases a good symmetrical load can be obtained. With the arrangement of three coils it proves that the middle one has only about half the phase power in consequence of the alternate induction by both the exterior windings; besides the power factor becomes bad.

The present invention has for its subject matter an arrangement for the inductive heating of vessels and the like wherein the vessel to be heated is mounted within three windings which are connected to the respective phases of a three phase alternating current system and the windings are separated by divided iron rings of U-shaped cross section.

It has been found that the shielding of the electro-magnetic fields of the windings may be attained if between the adjacent windings there are mounted either U-shaped, divided or slotted, iron rings, or two spaced apart iron rings which may be either multi-sectional or slotted and which are secured to the wall of the vessel in any appropriate manner as, for instance, by welding.

The arrangement according to the present invention is especially adapted to frusto-conical vessel shapes. Also with cylindrical vessels the arrangement may be of advantage, particularly in the case where the available heating surface is limited and space must be provided for the windings. Under certain circumstances the construction according to the present invention is also cheaper to manufacture.

According to invention the coils the separated from each other by U-shaped divided iron rings so as to define the paths for the flux lines in such manner that the flux lines from one coil will not cut the other coil. The flanges must be broadened as much as to jut out at least for the thickness of the coils, so as to prevent the leakage flux from one coil passing through the other coil. It is necessary to subdivide them since elsewise there would arise disadvantageous short circuit circles. These rings subdivided once or several times are welded on the walls of the vessel or fastened to them in a way that they can be taken off directly.

The arrangement is represented schematically in the drawing wherein:

Figure 1 is a vertical sectional view showing the vessel surrounded by the windings with the latter separated by the U-shaped divided iron rings; and Figure 2 is a view similar to Figure 1 but showing the windings separated by spaced apart iron rings.

The exciting windings 2 and 3 are put round the wall of the vessel 1. They are separated from each other by a slotted U-shaped ring 4, as shown in Figure 1 or by spaced apart rings 4'—4', as shown in Figure 2.

The arrangement is simple and secures symmetry in phase load. These rings must also bear the windings whereby a special mechanism for this purpose becomes superfluous. The rings could also be massive; this, however, would only mean waste of material and a troublesome building in of superfluous weight.

While the arrangement according to the present invention is particularly adapted for use in combination with the Scott three to two phase transformer connection, it is not necessarily limited to such use. Three windings could be placed around the vessel 1 and connected to the respective phases of a three phase alternating current system. The divided U-shaped rings 4 would then be mounted between the adjacent windings. It is also the case that only two windings may be used and these connected across two of the phases of a three phase system. The Scott transformer connection is only necessary where it is imperative to avoid an unbalanced load on a three phase system.

I claim:

In an arrangement for the polyphase induction heating of a vessel and its contents, in combination, a vessel, spaced coaxial coils surrounding the vessel and adapted for connection to respective phases of a current supply, a magnetic shield disposed between each pair of adjacent coils and comprising a pair of axially spaced ring-shaped members of ferro-magnetic material, each of said members having one portion in engagement with the wall of the vessel and a flange portion extending outwardly therefrom and abutting the end of one of said coils, said flange portion having a radial dimension at least equal to the radial dimension of said one coil, said ring-shaped members extending about said vessel except for at least one gap portion extending parallel to the axis of said coils to prevent the circulation of currents around said members, said flange portions being adjacent the facing ends of adjacent coils.

CARL CHRISTIAN SCHÖRG.

REFERENCES CITED

The following references are of record in the file of this patent:

UNITED STATES PATENTS

| Number | Name | Date |
|---|---|---|
| 1,378,188 | Northrup | May 17, 1921 |
| 1,683,146 | Thomson | Sept. 4, 1928 |
| 1,818,107 | Taylor | Aug. 11, 1931 |
| 1,834,445 | Brace | Dec. 1, 1931 |
| 1,839,801 | Northrup | Jan. 5, 1932 |
| 1,861,870 | Long | June 7, 1932 |
| 1,983,242 | Rohn | Dec. 4, 1934 |
| 2,363,582 | Gerber et al. | Nov. 28, 1944 |
| 2,423,912 | Tama et al. | July 15, 1947 |

FOREIGN PATENTS

| Number | Country | Date |
|---|---|---|
| 283,886 | Great Britain | June 21, 1928 |
| 501,903 | Great Britain | Mar. 7, 1939 |